US00RE43002E

(19) United States
(12) Reissued Patent
Nally et al.

(10) Patent Number: US RE43,002 E
(45) Date of Reissued Patent: Dec. 6, 2011

(54) NET SCORING SYSTEM

(75) Inventors: Michael Nally, Ridgewood, NJ (US); David Rossi, Newton, NJ (US); Beth Shergalis, Bloomfield, NJ (US)

(73) Assignee: Sportcraft, Ltd., Budd Lake, NJ (US)

(21) Appl. No.: 10/832,228

(22) Filed: Apr. 26, 2004

Related U.S. Patent Documents

Reissue of:
(64) Patent No.: 6,234,918
Issued: May 22, 2001
Appl. No.: 09/414,701
Filed: Oct. 8, 1999

(51) Int. Cl.
*A63B 61/00* (2006.01)

(52) U.S. Cl. ..... 473/473; 473/490; 273/DIG. 26

(58) Field of Classification Search ..... 473/473, 473/474, 475, 490, 494, FOR. 21, FOR. 116; 273/DIG. 26
See application file for complete search history.

(56) References Cited

U.S. PATENT DOCUMENTS

| | | | | |
|---|---|---|---|---|
| 5,025,748 | A * | 6/1991 | Pettis | 116/222 |
| 5,329,874 | A * | 7/1994 | Posey | 116/222 |
| 5,348,309 | A * | 9/1994 | Queiros | 473/467 |
| 5,385,113 | A * | 1/1995 | Hierath | 116/222 |
| 5,733,210 | A * | 3/1998 | Yiu | 473/475 |
| 5,894,261 | A * | 4/1999 | Green | 340/323 R |

* cited by examiner

*Primary Examiner* — William M Pierce
(74) *Attorney, Agent, or Firm* — Fellers Snider Blankenship Bailey & Tippens, PC

(57) ABSTRACT

The present invention is directed to a net scoring system for accurate and convenient scoring of a sporting contest. The net scoring system has a game net which is of a generally rectangular shape and has a periphery defined by a top edge, a bottom edge, and opposing side edges. The net scoring system also includes at least one indicating device for displaying a game score that is connected to the game net. The indicating device may be located on at least one of the top edge, the bottom edge, and the opposing side edges. The indicating device includes a plurality of scoring symbols and a symbol indicating assembly that selectively emphasizes one of the plurality of scoring symbols to represent a score.

7 Claims, 3 Drawing Sheets

NET SCORING SYSTEM

Matter enclosed in heavy brackets [ ] appears in the original patent but forms no part of this reissue specification; matter printed in italics indicates the additions made by reissue.

FIELD OF INVENTION

The present invention relates to a scoring system for use in sports activities. In particular, the present invention pertains to a net scoring system that can be used to accurately maintain the score of a sports contest, can be easily transported with a game net and can be used in a variety of sports activities at a variety of locations.

BACKGROUND OF THE INVENTION

A portable game net is a usefull piece of sporting equipment to own. Because sports enthusiasts can use game nets for a variety of sports activities, such as volleyball and badminton, game nets have become increasingly popular in recent years. Players may hang game nets between two fixed vertical structures, such as poles or trees, at varying heights above the ground, depending on the sports activity being played. As such, game nets are useful in backyards, over swimming pools, or any variety of playing surfaces where sports activities are played.

In playing sporting events using a game net, even the most casual player often desires to keep score of the contest. In many instances, this is achieved by each player simply keeping track of the score in his or her head. Because this method of scoring does not include a visual representation of the current score, however, it often leads to inaccurate scoring and requires each player to continually remember the current score and state it aloud so that all participants are informed. Scoreboards are often used at high school, college or professional sporting events, but are often too large, complex and stationary to be used in the variety of sporting venues where game nets are used by recreational players. Therefore, what is needed is a simple scoring system that a player can easily transport with a game net and use in a variety of sports activities at various game-playing locations.

The prior art has attempted to provide scoring systems. For example, U.S. Pat. No. 5,489,122 to Pittner discloses a personal tennis score keeper. U.S. Pat. No. 5,385,113 to Hierath discloses a tennis score keeper and display device. U.S. Pat. No. 5,294,913 to Mower et al. discloses an indoor/outdoor portable basketball scoreboard and U.S. Pat. No. 5,025,748 to Pettis teaches a portable scoring device. The designs of many of these devices are complex and require the players to transport equipment in addition to the game net. In addition, many of these scoring devices are not useful in physical locations where sporting activities using game nets are often played. Accordingly, there remains a need for a simple scoring system that a player can easily transport with a game net and use in a variety of sports activities at various game-playing locations.

The present invention answers the need for such a scoring system. The design of the present invention enables players to easily and accurately maintain the score of a sporting contest. In addition, because the present invention includes a game net, it can be conveniently transported without requiring additional equipment. Moreover, the present invention can be used in a variety of sports activities and at various game-playing locations.

OBJECTS OF THE INVENTION

It is an object of the present invention to provide a simple means for accurately keeping score of the number of points won during a sports activity that includes a game net.

It is another object of the present invention to provide a simple means for accurately keeping score of the number of games won during a sports activity that includes a game net.

It is still another object of the present invention to provide an easily visible indication of the score of a sports activity that includes a game net.

It is yet another object of the present invention to provide a team with a visible indication of their score and their opponent's score in a sports activity that includes a game net.

It is another object of the present invention to provide a means for keeping score that can be easily transported with a game net.

It is still another object of the present invention to provide a net scoring system that can be used in a variety of sports activities.

It is another object of the present invention to provide a net scoring system that can be used at a variety of game playing locations.

SUMMARY OF THE INVENTION

The present invention is directed to a net scoring system. The net scoring system has a game net which is of a generally rectangular shape and has a periphery defined by a top edge, a bottom edge, and opposing side edges. The game net also has a front face and a back face. The net scoring system also includes at least one indicating device for displaying a game score that is connected to the game net. The indicating device may be located on at least one of the top edge, the bottom edge, and the opposing side edges. Furthermore, the indicating device may be located on at least one of the front face and the back face of the game net.

In accordance with the present invention, the net scoring system may have a reinforcing tape that is attached to the top edge, the bottom edge, and the opposing side edges of the game net. Moreover, at least one indicating device having a plurality of scoring symbols may be located on the reinforcing tape. Furthermore, at least one indicating device may have a symbol indicating assembly for emphasizing one of the plurality of scoring symbols to represent a score.

In accordance with the present invention, the symbol indicating assembly may have a planar surface having portions defining a void through which one of the plurality of scoring symbols may be made visible. Furthermore, the symbol indicating assembly may have a fastening device that extends from the planar surface for slidably attaching the symbol indicating assembly to the reinforcing tape.

The present invention is also directed to a net scoring system having a plurality of scoring symbols located on both the front face and the back face of the game net, such that the symbol indicating assembly is capable of emphasizing the same symbol on both the front face and the back face of the game net.

In accordance with the present invention, the symbol indicating assembly may include a first planar surface having portions defining a void through which one of the plurality of scoring symbols located on the front face of the game net may be made visible. The symbol indicating assembly may include a second planar surface having portions defining a void through which one of the plurality of scoring symbols located on the back face of the game net may be made visible. The first planar surface is connected to the second planar surface such that the symbol indicating assembly is slidably attached to the reinforcing tape.

The indicating device according to the present invention may include an LCD display. The LCD display includes a processing device for adding a point to the current score and a processing device for resetting the current score to zero.

In accordance with the present invention, at least one indicating device may include a plate having a flat planar surface. The flat planar surface is formed to include at least one slot. A plurality of scoring symbols are located on the plate. At least one symbol indicating assembly is slidably attached to the plate through the slot. The plate according to the present invention may be fixedly attached to the reinforcing tape.

The present invention is also directed to a method of indicating the score of a sporting contest. The steps of the method may include providing a game net that includes at least one scoring symbol located on the game net, and at least one symbol indicating assembly connected to the game net. The steps of the method may also include selectively sliding at least one symbol indicating assembly over at least one scoring symbol to indicate the current score.

It is to be understood that both the foregoing general description and the following detailed description are exemplary and explanatory only, and are not restrictive of the invention as claimed. The accompanying drawings, which are incorporated herein by reference, and which constitute apart of the specification, illustrate certain embodiments of the invention, and together with the detailed description, serve to explain the principles of the present invention.

BRIEF DESCRIPTION OF THE DRAWINGS

The present invention will now be described in conjunction with the following drawings in which like reference numerals designate like elements and wherein.

DETAILED DESCRIPTION OF THE INVENTION

Figure 1:
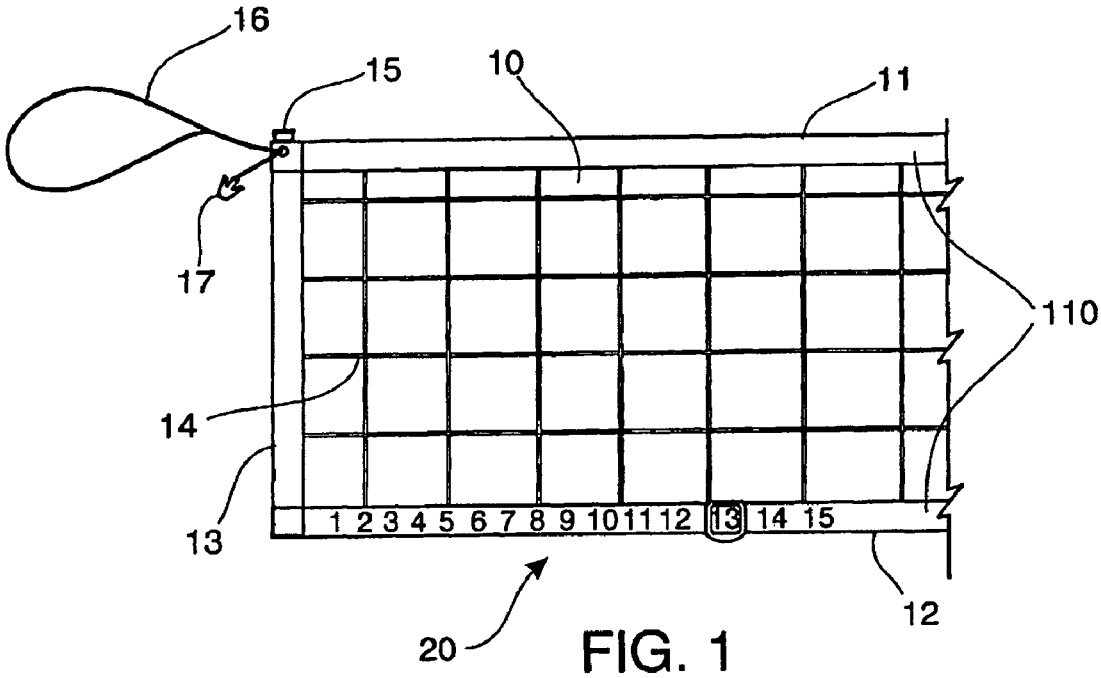
FIG. 1 is a front view of the net scoring system in accordance with the present invention.
Figure 4:
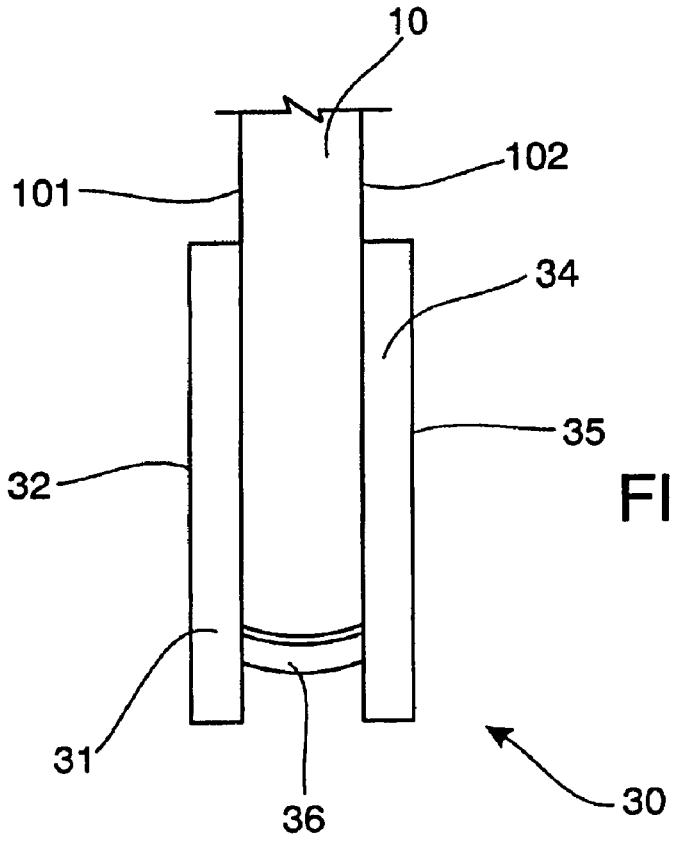
FIG. 4 is a side view of the symbol indicating assembly according to another embodiment of the present invention.

Reference will now be made in detail to a game net 10 and at least one indicating device 20 of the present invention, an example of which is illustrated in FIG. 1. The game net 10 is defined by a generally rectangular periphery which includes a top edge 11, a bottom edge 12, and two opposing side edges 13. The game net 10 has a front face 101 and a back face 102 (as shown in FIG. 4). With reference to FIG. 1, a mesh fabric 14 extends across the area defined by the periphery of the game net 10. A reinforcing tape 110 is attached to the top edge 11, the bottom edge 12, and the two opposing side edges 13.

It is contemplated that the game net 10 may include reinforcing rods 15 which are inserted through a longitudinal opening within the reinforcing tape 110. The game net 10 can be extended between two fixed structures, such as poles or trees (not shown), and secured to them using an appropriate hanging means 16, such as, for example, a nylon cord. It is also contemplated that the game net 10 may include a locking assembly 17 for further securing the game net 10 to the fixed structures.

It is further contemplated that the present invention may be hung at various heights above the ground to be used for a wide variety of sports activities, including but not limited to, volleyball, badminton, tennis, and various swimming pool games. It is also contemplated that the present invention may be used in a wide variety of locations, including but not limited to, backyards, beaches, parks, gymnasiums and over swimming pools.

Figure 2:
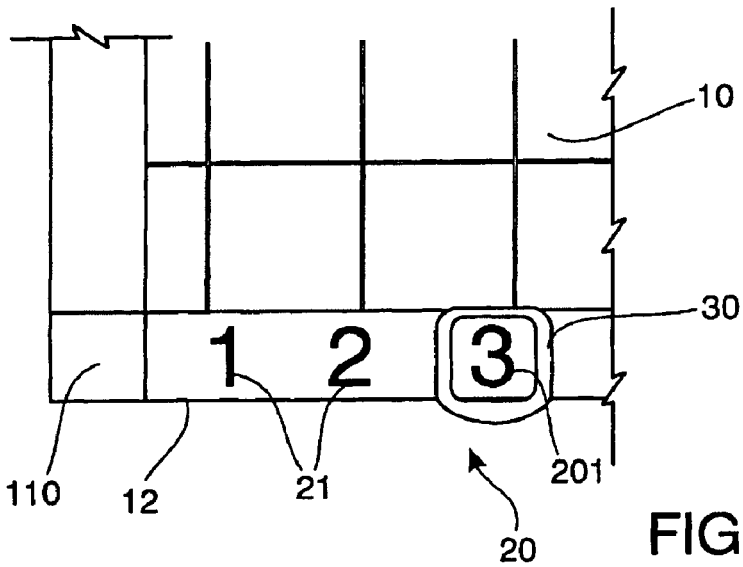
FIG. 2 is a front view of the indicating device of FIG. 1.

In one embodiment of the present invention, as shown in FIG. 2, the at least one indicating device 20 for indicating the current score 201 of one of the teams is positioned on the reinforcing tape 110 attached to the bottom edge 12 of the game net 10. The indicating device 20 includes a plurality of scoring symbols 21 connected to the reinforcing tape 110. By way of example, the plurality of scoring symbols 21 could be a numeric range from zero (0) through fifteen (15), which is the range of scores for a typical volleyball game. Other numeric or symbolic ranges, however, are considered to be well within the scope of the present invention. In the preferred embodiment of the present invention, the plurality of scoring symbols 21 are printed on the reinforcing tape 110 of the game net 10. However, it is contemplated that the plurality of scoring symbols 21 may be connected to the game net 10 in other ways, such as, for example, embroidering the symbols or using decals. Because the present invention includes both the game net 10 and the indicating device 20, it allows a player to easily transport a scoring system without additional equipment.

Figure 3:
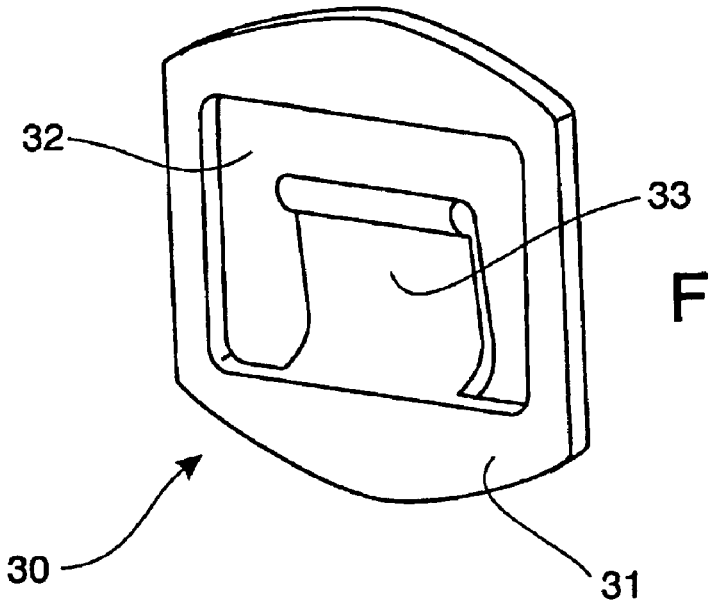
FIG. 3 is a schematic view of the symbol indicating assembly of FIG. 1.

The indicating device 20 also includes symbol indicating assembly 30 used to represent the current score 201 of one of the teams. The symbol indicating assembly 30 is slidably attached to reinforcing tape 110. In one embodiment, as shown in FIG. 3, the symbol indicating assembly 30 includes a planar surface 31, a void 32 through which one of the plurality of scoring symbols 21 (the current score 201) is visible, and a fastening assembly 33 extending from the planar surface 31 for slidably attaching to reinforcing tape 110. This provides players with an easily visible indication of the score of their sports activity. Other embodiments of the symbol indicating assembly 30 are considered within the scope of the present invention, including but not limited to, an assembly having a pointer to indicate the score. Moreover, it is contemplated that the symbol indicating assembly 30 may be constructed from plastic, metal, or any other appropriate material.

In another embodiment of the present invention, two indicating means 20 are positioned on both the front face 101 and the back face 102 of the game net 10, such that on each face, one indicating means 20 is located closer to one of the side edges 13 and the other indicating means 20 is located closer to the other of the side edges 13. In this manner, on each face of the game net 10, one indicating means 20 is for representing that team's score and one indicating means 20 is used to represent their opponent's score. Furthermore, a plurality of scoring symbols 21 are positioned on both the front face 101 and the back face 102 of the game net 10, such that each symbol indicating assembly 30 is capable of emphasizing the same one of the plurality of scoring symbols 21 on both the front face 101 and the back face 102 of the game net 10. Thus, when one team adjusts its score on one side of game net 10, their opponent on the other side of game net 10 sees the score adjusted as well. This enables each team to easily, accurately, and visually determine both their score and their opponent's score at all times. It is contemplated that the plurality of scoring symbols 21 could be printed such that the score for the two different teams are printed in different colors to further facilitate the determination of each team's score.

In this embodiment, as shown in FIG. 4, the symbol indicating assembly 30 includes a first planar surface 31, a void 32 through which one of the plurality of scoring symbols 21 is visible on one side of game net 10, a second planar surface 34, and a void 35 through which one of the plurality of scoring symbols 21 is visible on the other side of game net 10. Planar surface 31 is connected to planar surface 34 by a connecting member 36, such that each surface is pulled slightly toward the other. This enables the symbol indicating assembly 30 to be slidably attached to the reinforcing tape 110.

It is contemplated by the present invention that at least one indicating device 20 may be used for indicating the number of games won by a team. In this manner, additional scoring symbols 21 may be added to represent the score in games. Also, at least one additional symbol indicating assembly 30 may be added to represent the current number of games won by a team.

Figure 5:
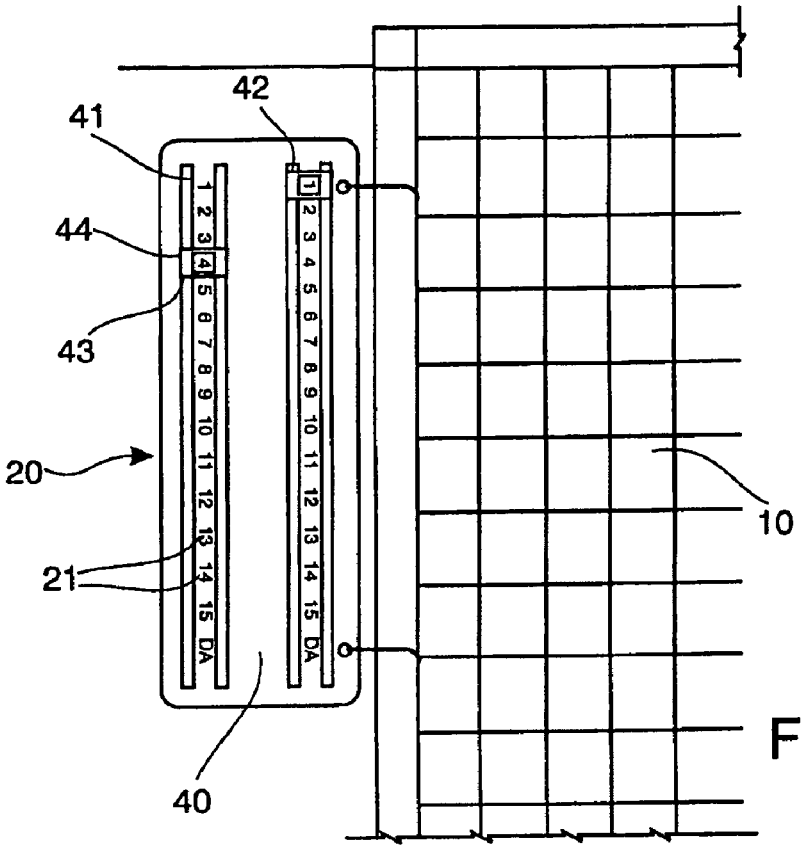
FIG. 5 is a front view of the indicating device according to another embodiment of the present invention.

In another embodiment of the present invention, the indicating device 20 includes a flat plate 40, as shown in FIG. 5. The plate 40 includes at least one slot 41 formed therein and has a plurality of scoring symbols 21 printed on plate 40. Symbol indicating assembly 42 is slidably attached to the plate 40 through at least one slot 41. Symbol indicating assembly 42 has a planar surface 43 and a void 44 through which one of the plurality of scoring symbols 21 is visible, representing the current score. The indicating device 20 of this embodiment may be connected to the game net 10 or it is contemplated that the indicating device 20 may be connected to a fixed structure, such as a pole.

Figure 6:
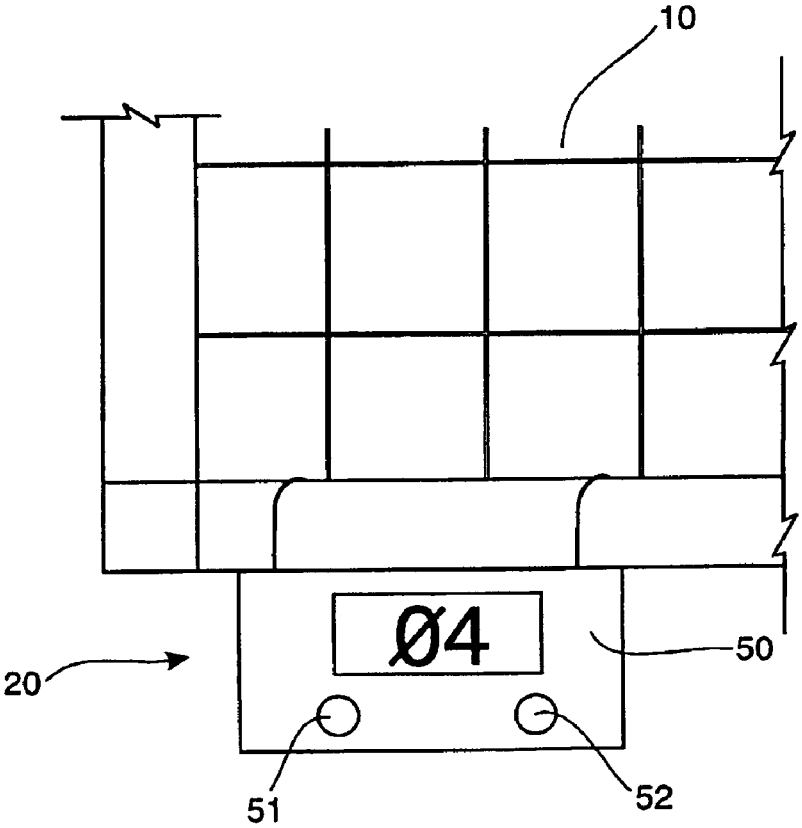
FIG. 6 is a front view of the indicating device according to another embodiment of the present invention.

In yet another embodiment of the present invention, the indicating device 20 include an LCD display 50, as shown in FIG. 6. The LCD display 50 is connected to the game net 10. The LCD display 50 includes a score button 51 for adding a point to the current score and a reset button 52 for returning the current score to zero.

Although this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A net scoring system, comprising:

a game net having a generally rectangular shape, wherein said game net is defined by a top edge, a bottom edge, opposing side edges, a front face, and back face and wherein said game net includes a reinforcing tape attached to said top edge, said bottom edge and said opposing side edges; and at least one indicating means for displaying a game score, said at least one indicating means being connected to said game net wherein said indicating means includes a plurality of scoring symbols located on said reinforcing tape and symbol indicating means for emphasizing one of said plurality of scoring symbols to represent a score including, a planar surface having portions defining a void through which one of said plurality of scoring symbols may be made visible; and fastening means extending from said planar surface for slidably attaching said symbol indicating means to said reinforcing tape.

2. The net scoring system according to claim 1, wherein said at least one indicating means is located on at least one of said top edge, said bottom edge, and said opposing side edges.

3. The net scoring system according to claim 1, wherein said at least one indicating means is located on at least one of said front face and said back face.

[4. The net scoring system according to claim 1, wherein said at least one indicating means comprises:

an LCD display, wherein said LCD display includes a processing means for adding a point to the current score and a processing means for resetting the current score to zero.]

[5. A net scoring system, comprising:

a game net having a generally rectangular shape, wherein said game net is defined by a top edge, a bottom edge, opposing side edges, a front face, and a back face; and a reinforcing tape attached to said top edge, said bottom edge, and said opposing side edges;

at least one indicating means for displaying a game score, said at least one indicating means being connected to said game net and including a plurality of scoring symbols located on said reinforcing tape, comprising:

symbol indicating means for emphasizing one of said plurality of scoring symbols to represent a score wherein said plurality of scoring symbols are located on said front face and said back face, such that said symbol indicating means is capable of emphasizing the same symbol on both said front face and said back face.]

6. The net scoring system according to claim 1 wherein said reinforcing tape further includes removably attached at least one reinforcing rod.

7. The net scoring system according to claim 1 wherein said symbol indicating means is made from plastic.

8. The net scoring system according to claim 1 wherein said symbol indicating means is made from metal.

*9. A net scoring system, comprising:*

*a game net having a generally rectangular shape, wherein said game net is defined by a top edge, a bottom edge, opposing side edges, a front face, and a back face; and a reinforcing tape attached to said top edge, said bottom edge, and said opposing side edges;*

*at least one indicating means for displaying a game score, said at least one indicating means being connected to said game net and including a plurality of scoring symbols located on said reinforcing tape, comprising:*

*symbol indicating means for emphasizing one of said plurality of scoring symbols to represent a score wherein said plurality of scoring symbols are located on said front face and said back face, such that said symbol indicating means is capable of emphasizing the same symbol on both said front face and said back face, wherein said symbol indicating means includes:*

*a first planar surface having portions defining a void through which one of said plurality of scoring symbols located on said front face may be made visible;*

*a second planar surface having portions defining a void through which one of said plurality of scoring symbols located on said back face may be made visible; and*

*wherein said first planar surface is connected to said second planar surface such that said symbol indicating means is slidably attached to said reinforcing tape.*

* * * * *